US008083422B1

(12) United States Patent
Simmons et al.

(10) Patent No.: US 8,083,422 B1
(45) Date of Patent: *Dec. 27, 2011

(54) HANDHELD TATTOO PRINTER

(75) Inventors: Asher Simmons, Corvallis, OR (US); James Mealy, Austin, TX (US); James D. Bledsoe, Albany, OR (US)

(73) Assignee: Marvell International Ltd. (BM)

( * ) Notice: Subject to any disclaimer, the term of this patent is extended or adjusted under 35 U.S.C. 154(b) by 988 days.

This patent is subject to a terminal disclaimer.

(21) Appl. No.: 11/952,849

(22) Filed: Dec. 7, 2007

Related U.S. Application Data

(60) Provisional application No. 60/892,693, filed on Mar. 2, 2007.

(51) Int. Cl.
B41J 2/145 (2006.01)
B41J 3/36 (2006.01)
(52) U.S. Cl. ........... 400/62; 400/88; 347/40; 347/109; 358/1.18; 358/1.5
(58) Field of Classification Search .......... 400/62
See application file for complete search history.

(56) References Cited

U.S. PATENT DOCUMENTS

| 3,469,422 A | 9/1969 | Minton |
| 4,387,579 A | 6/1983 | Branke et al. |
| 4,714,936 A * | 12/1987 | Helinski et al. ............ 347/38 |
| 5,351,069 A | 9/1994 | Koike et al. |
| 5,578,813 A | 11/1996 | Allen et al. |
| 5,593,236 A * | 1/1997 | Bobry ............ 400/88 |
| 5,825,995 A | 10/1998 | Wiklof et al. |
| 5,861,877 A * | 1/1999 | Kagayama et al. ........... 345/179 |
| 5,927,872 A * | 7/1999 | Yamada ............ 400/88 |
| 6,000,946 A | 12/1999 | Snyders et al. |
| 6,030,582 A | 2/2000 | Levy |
| 6,217,017 B1 | 4/2001 | Yamazaki |
| 6,312,124 B1 * | 11/2001 | Desormeaux ............ 347/109 |
| 6,332,677 B1 | 12/2001 | Steinfield et al. |
| 6,357,939 B1 | 3/2002 | Baron |
| 6,390,249 B2 | 5/2002 | Tachibana |
| 6,467,870 B2 | 10/2002 | Matsumoto et al. |
| 6,517,266 B2 * | 2/2003 | Saund ............ 400/88 |
| 6,580,244 B2 | 6/2003 | Tanaka et al. |
| 6,682,190 B2 | 1/2004 | Rasmussen et al. |
| 6,773,177 B2 * | 8/2004 | Denoue et al. ............ 400/88 |

(Continued)

FOREIGN PATENT DOCUMENTS

EP 1 543 981 A3 7/2006

(Continued)

OTHER PUBLICATIONS

International Search Report mailed Jul. 28, 2008, for International Application No. PCT/US2008/55636.

(Continued)

Primary Examiner — Jill Culler

(57) ABSTRACT

A mobile, handheld and hand-propelled tattoo printer is disclosed for use in printing a tattoo design on a body part. The tattoo design may be any image, graphic, word, phrase, or other tattoo design. The tattoo printer receives or generates image data of the tattoo design. A user moves the tattoo printer on a body part for printing the tattoo design. A position module provides absolute position data so that the tattoo design is accurately printed. The tattoo printer can be used to apply countless tattoo designs based upon image data received from one or more sources.

21 Claims, 9 Drawing Sheets

U.S. PATENT DOCUMENTS

| | | |
|---|---|---|
| 6,789,869 B2 | 9/2004 | Takeishi |
| 6,851,878 B2 | 2/2005 | Hemmerlin |
| 6,896,349 B2 | 5/2005 | Valero et al. |
| 6,933,889 B1 | 8/2005 | Wolf et al. |
| 6,942,335 B2 | 9/2005 | Trent |
| 6,951,778 B2 | 10/2005 | Akhavain et al. |
| 6,952,284 B2 | 10/2005 | Andrews et al. |
| 7,013,029 B2 | 3/2006 | Keskar et al. |
| 7,108,370 B2 | 9/2006 | Breton |
| 7,184,167 B1 | 2/2007 | Ito et al. |
| 7,336,388 B2 | 2/2008 | Breton |
| 7,627,189 B2 | 12/2009 | Donomae et al. |
| 7,679,604 B2 | 3/2010 | Uhlik et al. |
| 7,808,450 B2 | 10/2010 | Wanda et al. |
| 7,812,994 B2 * | 10/2010 | Carlson et al. ............... 358/1.18 |
| 2003/0043388 A1 | 3/2003 | Andrews et al. |
| 2003/0152679 A1* | 8/2003 | Garwood ...................... 426/392 |
| 2004/0252051 A1 | 12/2004 | Johnson |
| 2006/0050131 A1 | 3/2006 | Breton |
| 2006/0244347 A1 | 11/2006 | Bae et al. |
| 2006/0279784 A1 | 12/2006 | Carlson et al. |
| 2007/0009277 A1 | 1/2007 | Shoen |
| 2007/0080494 A1 | 4/2007 | Marshall et al. |
| 2007/0216737 A1 | 9/2007 | Hart |
| 2007/0263062 A1 | 11/2007 | Noe et al. |
| 2008/0075513 A1 | 3/2008 | Robertson et al. |
| 2008/0123126 A1 | 5/2008 | Harris |
| 2008/0144053 A1 | 6/2008 | Gudan et al. |
| 2008/0204770 A1 | 8/2008 | Bledsoe et al. |
| 2008/0211848 A1* | 9/2008 | Mealy et al. .................... 347/14 |
| 2008/0211864 A1 | 9/2008 | Mealy et al. |
| 2008/0212118 A1 | 9/2008 | Mealy et al. |
| 2008/0212120 A1* | 9/2008 | Mealy et al. ................. 358/1.12 |
| 2008/0213018 A1 | 9/2008 | Mealy et al. |
| 2008/0215286 A1 | 9/2008 | Mealy et al. |
| 2008/0262719 A1* | 10/2008 | Bledsoe et al. ............... 701/207 |

FOREIGN PATENT DOCUMENTS

| | | |
|---|---|---|
| WO | WO 03/055689 A1 | 7/2003 |
| WO | WO 03/076196 A1 | 9/2003 |
| WO | WO 03/076197 | 9/2003 |
| WO | WO 2004/056577 A1 | 7/2004 |
| WO | WO 2004/088576 | 10/2004 |
| WO | WO 2005/070684 A1 | 8/2005 |

OTHER PUBLICATIONS

Written Opinion of the International Searching Authority mailed on Jul. 28, 2008, for International Application No. PCT/US2008/55636.
GB Search Report for GB Application No. 0610837.7, dated Oct. 31, 2006, 2 pages.
HP Ink Jet Printer Cartridge Anatomy, http://wandel.ca.hp45_anatomy/index.html, printed Apr. 19, 2007, pp. 1-8.
U.S. Appl. No. 12/036,862, entitled, "Print Head Configuration for Hand-Held Printing", filed Feb. 25, 2008, 32 pages.
U.S. Appl. No. 12/039,491 entitled, "Cap Design for an Inkjet Print Head With Hand-Held Imaging Element Arrangement With Integrated Cleaning Mechanism", filed Feb. 28, 2008. 38 pages.
U.S. Appl. No. 12/041,466 entitled, "Ink Supply for a Hand-Held Ink Jet Printer", filed Mar. 3, 2008, 38 pages.
U.S. Appl. No. 12/074,018 entitled, "Hand-Propelled Labeling Printer", filed Feb. 28, 2008, 47 pages.
U.S. Appl. No. 12/074,123, entitled, "Managing Project Information with a Hand-Propelled Device", filed Feb. 28, 2008, 50 pages.
U.S. Appl. No. 12/132,405 entitled, Device and Method for Dispensing White Ink, filed Jun. 3, 2008, 37 pages.
U.S. Appl. No. 12/141,717, entitled, Hand-Held Printing Device and Method for Tuning Ink Jet Color for Printing on Colored Paper, filed Jun. 18, 2008, 38 pages.
U.S. Appl. No. 11/955,209, filed Dec. 12, 2007, Bledsoe et al.
U.S. Appl. No. 11/955,228, filed Dec. 12, 2007, Bledsoe et al.
U.S. Appl. No. 11/955,240, filed Dec. 12, 2007, Bledsoe et al.
U.S. Appl. No. 11/955,258, filed Dec. 12, 2007, Simmons et al.
U.S. Appl. No. 11/955,027, filed Dec. 18, 2007, Simmons et al.
U.S. Appl. No. 11/972,462, filed Jan. 10, 2008, Simmons et al.
U.S. Appl. No. 12/013,313, filed Jan. 11, 2008, Bledsoe et al.
U.S. Appl. No. 12/016,833, filed Jan. 18, 2008, Simmons et al.
U.S. Appl. No. 12/073,029, filed Feb. 25, 2008, Bledsoe et al.
U.S. Appl. No. 12/083,660, filed Feb. 27, 2008, McKinley et al.
U.S. Appl. No. 12/062,472, filed Apr. 3, 2008, McKinley et al.
U.S. Appl. No. 12/188,056, filed Aug. 7, 2008, Mealy et al.

* cited by examiner

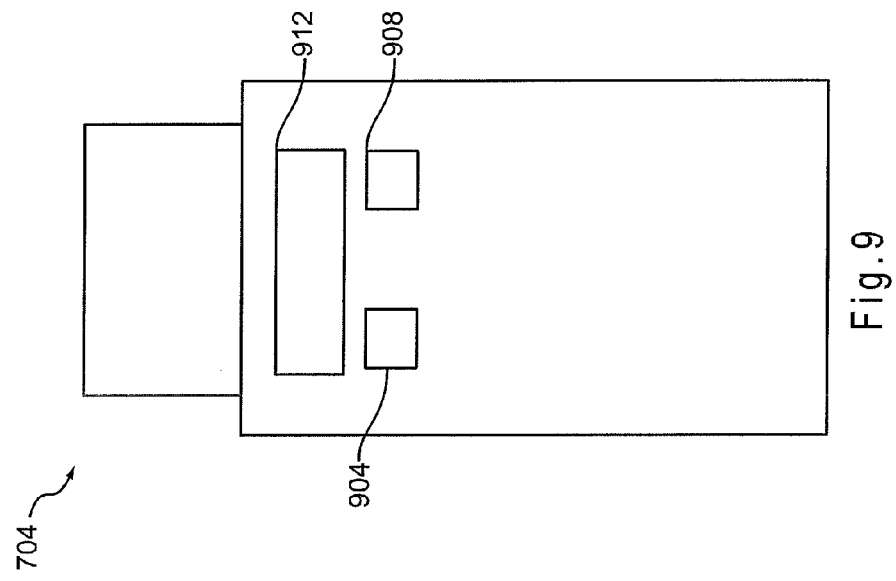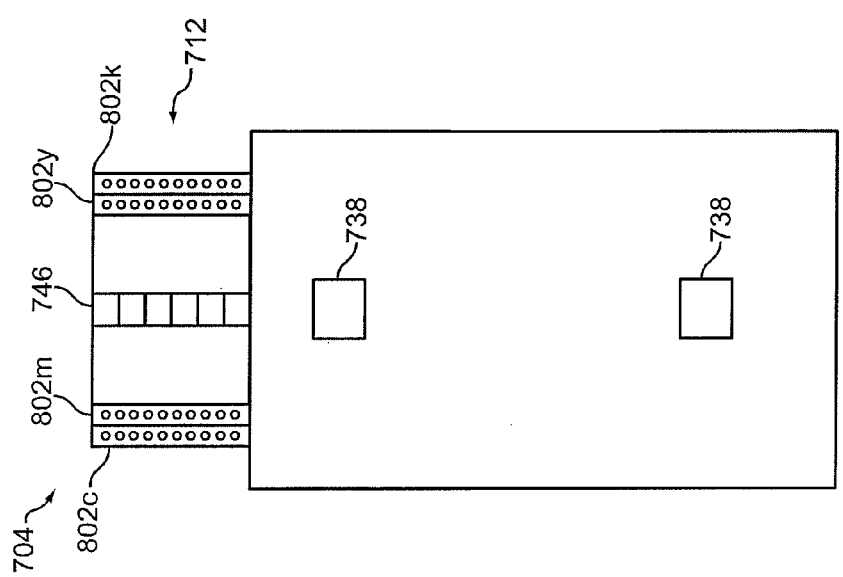

HANDHELD TATTOO PRINTER

RELATED APPLICATION

This application claims the benefit of U.S. Provisional Application No. 60/892,693, filed on Mar. 2, 2007, which is incorporated herein by reference.

BACKGROUND

1. Technical Field

The present disclosure relates to the field of temporary tattoos, and more particularly to a device for applying a temporary tattoo.

2. Related Art

A temporary tattoo is a body decoration often applied to the skin by transferring a tattoo design from a plastic or cloth paper with the aid of heat or water. Tattoos applied with the aid of heat or water run the risk of streaking or incomplete transfer from the paper to the skin. Also, a tattoo transferred from paper can be applied only once. Temporary tattoos can also be applied using a stencil design and spraying paint through the design onto the skin. Another method of applying a temporary tattoo is painting the skin with henna paste, a time consuming process. Applying multiple temporary tattoos and/or reapplying tattoos by way of any of the aforementioned methods can become expensive over time due to the costs of the supplies and associated fees incurred with each application. An improved approach to applying a temporary tattoo is desirable.

BRIEF SUMMARY

The following embodiments relate to a mobile, handheld and hand-propelled tattoo printer. The tattoo printer receives image data from a source, such as a memory device or host. A tattoo is applied to a body part by moving the tattoo printer about the surface of the skin as a print head dispenses ink in accord with the image data.

In a first embodiment, a tattoo printer is a mobile, handheld, hand-propelled printer having a processor. The processor receives image data corresponding to a tattoo design and generates print data based on the image data. A tattoo is applied by moving the tattoo printer on a body part as a print mechanism dispenses ink in accord with print data received from the processor.

In a second embodiment, the tattoo printer includes a position module to determine position data of the tattoo printer as it is moved about while rendering an image on a body part. The position data includes the location and the orientation of the tattoo printer relative to an origin and an initial orientation. The processor receives image data corresponding to a tattoo design and generates print data based on the image data and the position data. The processor communicates the print data to a print mechanism for printing the tattoo design.

A tattoo design applied by the tattoo printer may be an image, graphic, word, phrase, or any other type of tattoo design. The tattoo printer may also have a wireless interface to communicate with a host or other device for receiving image data corresponding to a tattoo design. The tattoo printer may have a port for receiving a memory device having image data.

The position module may have a movement module to generate movement data in response to movement of the tattoo printer. The movement data indicates the location and the orientation of the tattoo printer relative to the origin and the initial orientation. The position module may also have two motion sensors to communicate motion signals to the movement module in response to movement of the tattoo printer. In a preferred version, a position module processor receives the movement data and determines the position data. The position data includes location and orientation data indicative of a position of the tattoo printer's print head.

The tattoo printer may have a housing having a length of approximately five inches, a width of approximately two inches, and a height of approximately one inch. The tattoo printer may include a print mechanism having a plurality of nozzles arranged in rings around a sensor element such as a scan head.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

BRIEF DESCRIPTION OF THE DRAWINGS

FIG. 8 is a bottom plan view of the tattoo printing and scanning device of FIG. 7;

FIG. 9 is a top plan view of the tattoo printing and scanning device of FIG. 7;

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

The embodiments below relate to a mobile, handheld and hand-propelled tattoo printer for use in applying a tattoo to a body part. The tattoo printer receives image data from a host or other device and/or generates image data by scanning an image. The image data corresponds to a tattoo design, such as an image, graphic, word, phrase, or any other type of tattoo design that is to be printed on a body part. The tattoo printer has a position module to maintain image alignment as the tattoo printer is moved about the body part to print the tattoo design. The tattoo printer can be used to apply countless tattoo designs based upon image data received from one or more sources.

Figure 1:
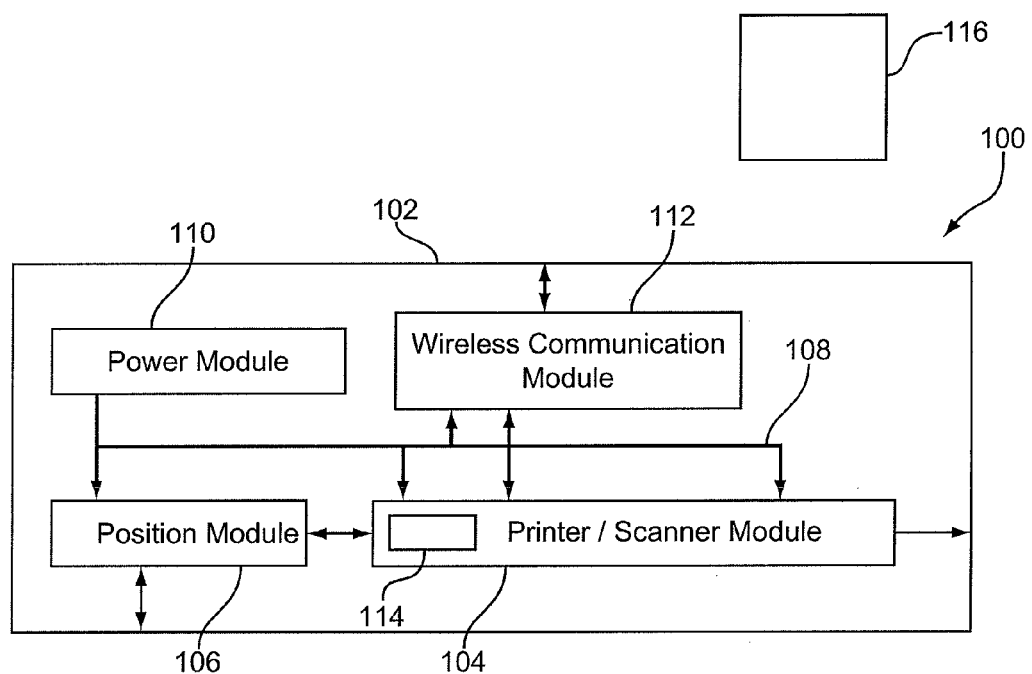
FIG. 1 is a diagram of a system that includes a version of a tattoo printer for use in applying a tattoo design to a body part in accord with an embodiment of the invention.

FIG. 1 is a diagram of a system 100 that includes a tattoo printer 102 for use in applying a tattoo design to a body part in accord with an embodiment of the invention. The tattoo printer 102 is a mobile, handheld and hand-propelled printer or printer-scanner combination.

In a preferred embodiment, the tattoo printer 102 has a printer/scanner module 104 having a module processor 114 for executing printing and/or scanning functions. The tattoo printer 102 preferably includes a data bus 108, a power module 110, and a wireless communication module 112 to communicate with a host 116 or other device for receiving image data corresponding to a tattoo design. The tattoo printer 102 may also or alternatively have a port (not shown) for establishing a physical connection to the host 116 or other device. It is to be understood that any data discussed hereinafter as communicated by way of the wireless communication module 112 may be communicated by way of a physical connection with the tattoo printer 102. The tattoo printer 102 may also include a slot or port for receiving a memory device such as a flash memory card or thumb drive, as examples.

The tattoo printer 102 is preferably handheld and hand-propelled, having dimensions suitable for single hand movement and control. In one version, the dimensions of the housing of the tattoo printer 102 are approximately five inches in length, two inches in width, and one inch in height. It is to be understood that the tattoo printer 102 may be any shape or size suitable for handheld, hand-propelled tattoo design image rendering.

If the tattoo printer 102 is a hand-propelled printer or printer-scanner, the wireless communication module 112 receives image data, such as a bitmap, from the host 116 and communicates the image data to the module processor 114. The image data corresponds to a tattoo design to be printed on a body part. The tattoo design may be any type of image, graphic, word, phrase, or any other type of tattoo design. The tattoo design may be selected from a library of tattoo designs maintained at the host 116, selected, and communicated to the tattoo printer 102 as image data.

The host 116 may be any type of device that provides image data. For example, the host 116 may be a desktop or laptop computer. A computer may include or have access to one or more files corresponding to tattoo designs that may be selected. The files may be stored in a memory device, such as a hard drive, and/or may include downloadable image and text files. The files may be read from a portable memory device, or received from an imaging device such as a digital camera or scanner. In alternate embodiments, the host 116 may be a digital camera, a personal digital assistant, a camera phone, a memory device, a graphic art application executed on a computer or any device that receives, generates, and/or stores image data, or can be used to create an image for communication to the tattoo printer 102.

To print a tattoo design, the tattoo printer 102 is placed on a body part. The tattoo printer 102 may be placed at a starting location in a designated, initial orientation to accurately align and position the tattoo design on a body part as it is printed.

As an operator moves the tattoo printer 102 about the body part, the tattoo design is printed in accord with the image data. The tattoo printer 102 may be moved about the body part along different paths to render the entire tattoo design. The paths need not be linear or follow a predetermined pattern because the tattoo printer 102 includes a position module 106 for determining the absolute position of the print head as it is moved in any direction to any location with respect to an origin or reference point. Thus, the tattoo printer 102 accurately prints the entire tattoo design at the correct location as it is moved about the surface of the body part, all the while continuously determining its position. The tattoo printer 102 preferably provides an audio or visual signal to the user/operator when the tattoo design has been completely printed on the body part.

As mentioned above, the tattoo printer 102 includes a position module 106 for determining its location and orientation as it is moved about the body part. The position module 106 provides location and orientation data to the module processor 114. The module processor 114 determines print data based on the image data and location and orientation data received from the position module 106. The module processor 114 communicates the print data to a print mechanism as the tattoo printer 102 is moved about the surface of the body part. The print mechanism renders the tattoo design on the body part based on the print data.

If the tattoo printer 102 is a hand-propelled printer-scanner, a media may be scanned to acquire an image file of an item featured on the media. The data file may then be printed by the tattoo printer 102 on a body part. Alternatively, the data file may be communicated to a host 116 or other device for editing or other purposes, such as cropping. The edited image file may then be communicated back to the tattoo printer 102 for printing on the body part.

For scanning media containing a desired tattoo design, the tattoo printer 102 is placed on and moved about the surface of the media as an imaging mechanism generates image signals. The module processor 114 receives the image signals from the imaging mechanism and determines image data based on the image signals and location and orientation data received from the position module 106. The tattoo printer 102 may be used to print the tattoo design as scanned, or the module processor 114 may communicate the image data to the wireless communication module 112, which communicates the image data to the host 116. The item may be edited at the host 116. The host 116 may be a desktop or laptop computer, or other device that communicates (sends/receives) image data. The wireless communication module 112 and the host 116 may comprise a network such as a wireless local area network (WLAN), as an example.

Figure 2:
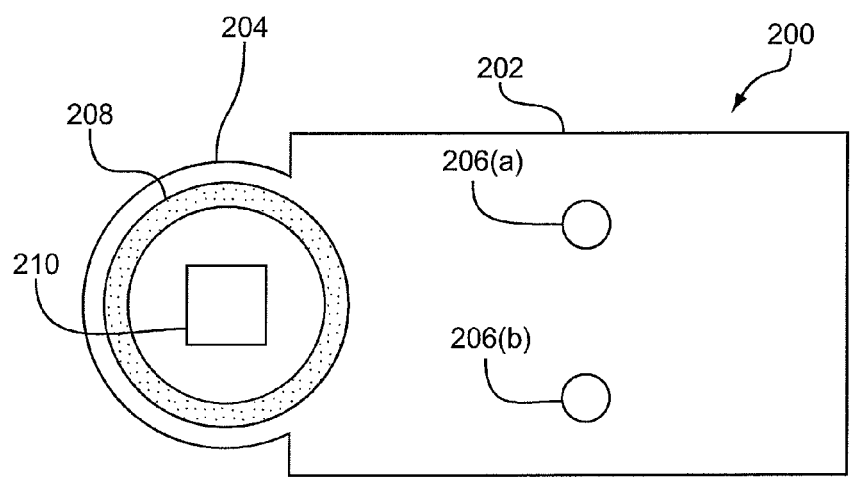
FIG. 2 is a bottom plan view of the tattoo printer of FIG. 1.

FIG. 2 is an illustration of an embodiment of the printing and/or scanning side (underside) 202 of a handheld, hand-propelled tattoo printer 200. The tattoo printer 200 has two motion sensors 206(a) and 206(b) and an imaging mechanism 204. The imaging mechanism 204 includes a print head 208 and a scan head 210. The print head 208 is circular having a plurality of nozzles for dispensing ink. Because the print head 208 is circular, ink may be deposited by the tattoo printer 200 as it is moved in any direction. In one version, the print head 208 deposits ink along a one-third inch print path as the tattoo printer 200 is moved. In other versions, the print path may be greater or less than one-third inch. As the tattoo printer 200 is moved about a body part, the motion sensors 206(a) and 206(b) generate motion signals for determining the absolute position of the print head 208 or scan head 210. This aspect of the tattoo printer 200 is discussed in greater detail below with reference to the position module 106.

Figure 3A:
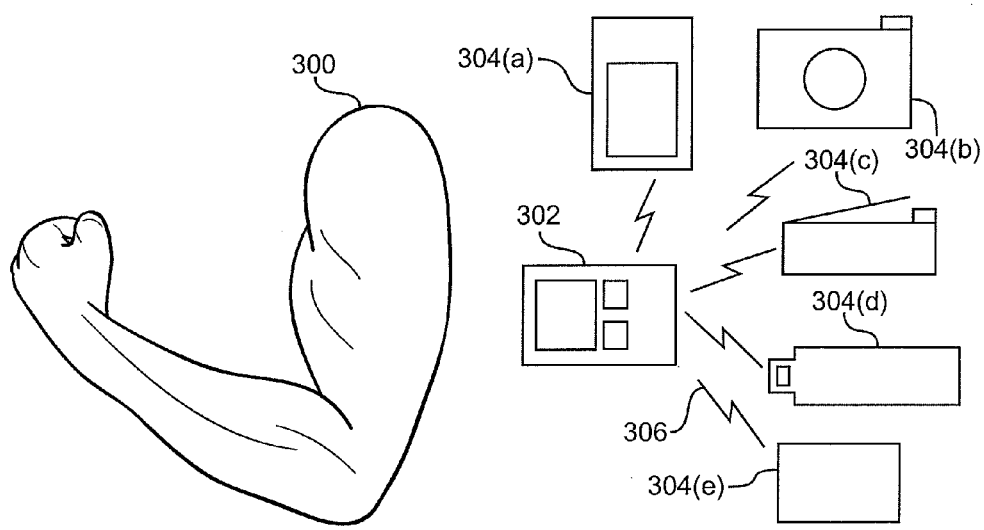
FIGS. 3(a)-3(c) illustrate an example of applying a tattoo design to a body part using the tattoo printer of FIG. 1.
Figure 3B:
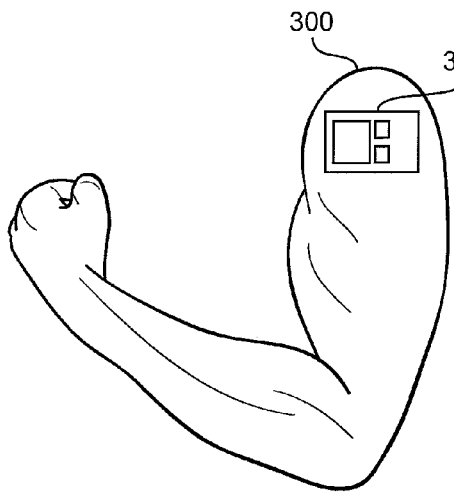
Figure 3C:
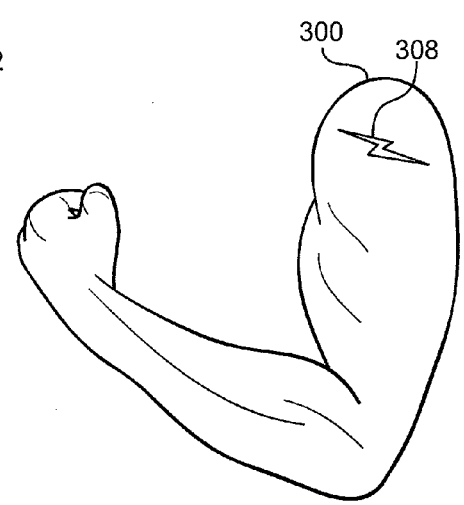

FIGS. 3(a)-3(c) illustrate an example of printing a tattoo design on a body part 300 using a handheld, hand-propelled tattoo printer 302. FIG. 3(a) shows a body part (arm) to receive the tattoo design, the tattoo printer 302, and examples of image file sources 304(a)-304(e). An image file source may be a computer 304(a), a digital camera 304(b), a desktop scanner 304(c), a universal serial bus flash memory device 304(d), or any other type of image file source 304(e). The image file source 304(a)-304(e) communicates image data to the tattoo printer 302 by way of a communication channel 306. The communication channel 306 may be wireless, wired, or a port for connection to a memory device. The image file source may be the tattoo printer 302 if it includes scanning capabilities.

FIG. 3(b) shows the tattoo printer 302 placed on the body part 300. The tattoo printer 302 is moved about the body part as print data is communicated to a print head to print the tattoo design 308 as shown in FIG. 3(c). As discussed above, the print data is based on image data and position data to accurately print the tattoo design 308 on the body part 300.

Figure 4:
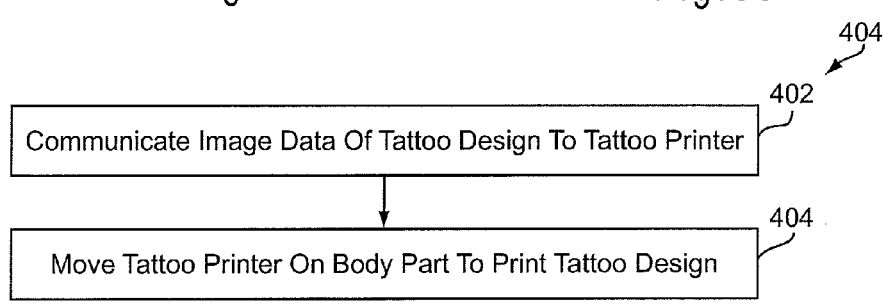
FIG. 4 shows acts for applying a tattoo design to a body part in accord with an embodiment of the invention.

FIG. 4 shows acts (400) for printing a tattoo design in accord with an embodiment of the invention. Image data corresponding to a tattoo design is communicated to the tattoo printer (Act 402). The image data may be communicated from any of the devices discussed above with reference to FIG. 5, as an example. The tattoo printer is placed on a body part and moved about to print the tattoo design (Act 404).

Figure 5:
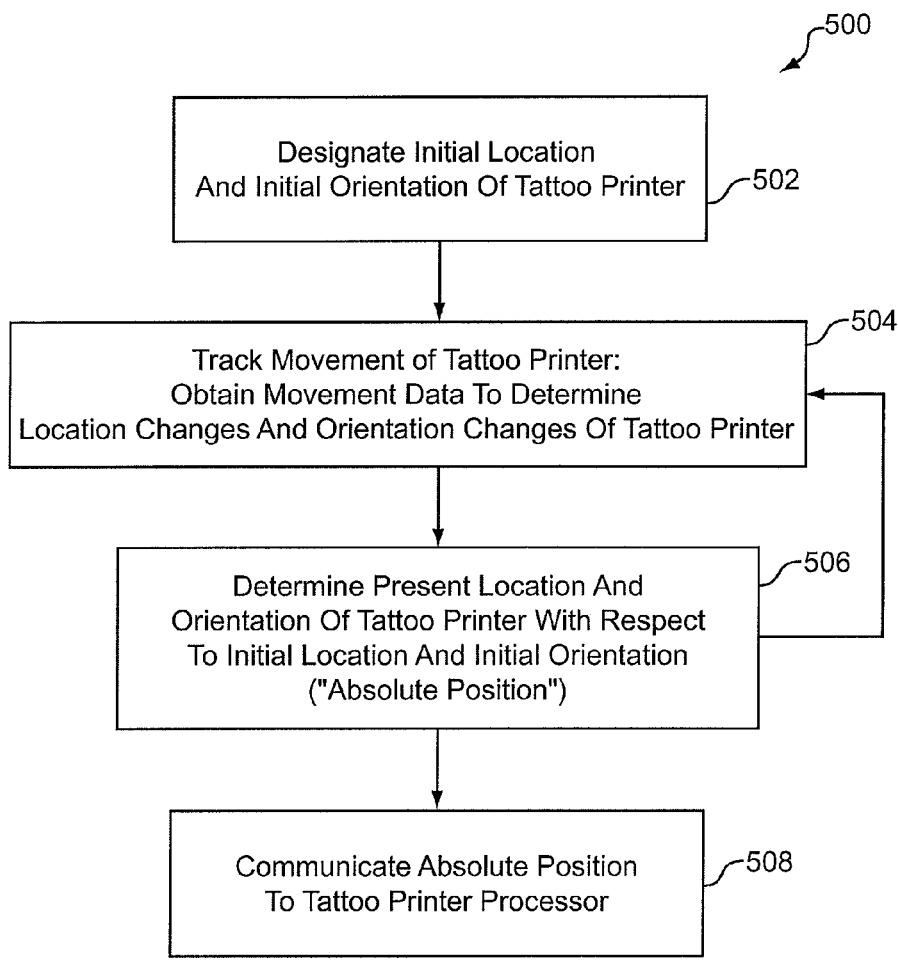
FIG. 5 shows acts for determining the location and orientation of a tattoo printer with reference to an initial position as the printer is moved.

FIG. 5 shows acts 500 for determining the position of a tattoo printer with reference to an initial position as the tattoo printer is moved about on a body part. The position of the tattoo printer is defined by the tattoo printer's location and orientation. The location of the tattoo printer may be represented by any point defined within or on the tattoo printer, such as a center-point or by an area of the tattoo printer such as a print head or scan head. The orientation of the tattoo printer is defined as an angle relative to an initial tattoo printer orientation.

In one embodiment, the tattoo printer is set at a position that is designated the initial position or "origin" of the tattoo printer. The origin includes an initial location and initial orientation of the tattoo printer on the body part before the tattoo printer is moved (Act 502). The act of designating an initial location and an initial orientation of the tattoo printer may be referred to as "zeroing the origin." The initial location and initial orientation may be defined within any two or three dimensional coordinate system. The tattoo printer may be set at a location determined for printing the tattoo design.

As the tattoo printer is moved, movement data is generated to track location changes and orientation changes of the tattoo printer (Act 504). The movement data may be generated by any component, module, or any mechanism that generates data indicative of movement.

Figure 6:
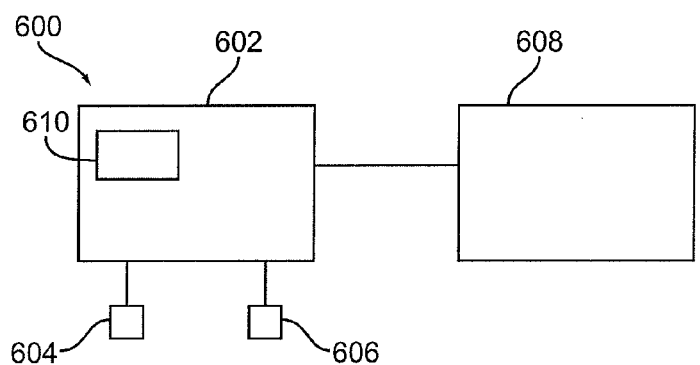
FIG. 6 is a block diagram of an embodiment of a position module for determining the location and orientation of a tattoo printer with reference to an initial position.

FIG. 6 shows an embodiment of a position module 600 that generates movement data. The position module 600 includes a movement module 602 and a processor 608. The movement module 602 includes two motion sensors 604 and 606. The motion sensors 604, 606 may be optical motion sensors such as light-emitting diode (LED) and complementary medal-oxide semiconductor (CMOS) sensor pairs. Each CMOS sensor captures hundreds of images per second as is moves. The movement module 602 includes a movement module processor 610 to receive the images from the motion sensors 604, 606. The movement module processor 610 detects patterns in each image and compares the patterns in successive images to determine movement direction and distance of each CMOS sensor. In alternate versions, the motion sensors 604, 606 may be track-ball motion sensors, laser motion sensors, inertial motion sensors, or other type of motion sensors that generate movement signals. The movement module processor 610 may be any hardware, software, or firmware based processor.

Direction and distance data is generated for both motion sensors 604, 606 as the tattoo printer moves. For example, as motion sensor 604 moves from point A to point B and motion sensor 606 moves from point M to point N, direction and distance data is generated by the movement module 602 for each sensor 604, 606. The location of motion sensor 604 with respect to point A and the location of motion sensor 606 with respect to point M is determined by the movement module 602 based on the direction and distance data generated for each respective sensor 604, 606. When motion sensor 604 next moves from point B to point C, the movement module 602 determines the location of motion sensor 204 with respect to point B. Likewise, when motion sensor 606 moves from point N to point O, the movement module 602 determines the location of motion sensor 606 with respect to point N. The movement module 602 generates movement data indicative of the movement of each motion sensor 604, 606 from point-to-point and communicates the movement data to the processor 608.

The processor 608 determines the position of the tattoo printer with respect to the origin (the initial location and initial orientation of the tattoo printer) by cumulating the movement data received from the movement module 602 (Act 506). The position of the tattoo printer determined by the processor 608 includes both the location and orientation of the tattoo printer with respect to the origin and may be referred to as the "absolute position" of the tattoo printer.

The location of the tattoo printer (or any point, line, or area of the tattoo printer) is determined by cumulating the movement data, starting from the origin. The orientation of the tattoo printer is defined as an angle between two lines: the first line is defined by the locations of the two motion sensors when the tattoo printer is at the origin; the second line is defined by the locations of the two motion sensors when the tattoo printer is at its respective location. As movement data continues to be received from the movement module 602 as the tattoo printer moves, the processor 608 continues to update the absolute position of the tattoo printer. The absolute position of the tattoo printer may be communicated as location and orientation data to a tattoo printer processor for use in printing a tattoo design on a body part or for generating scan data as an tattoo design item is scanned (Act 508).

Figure 7:
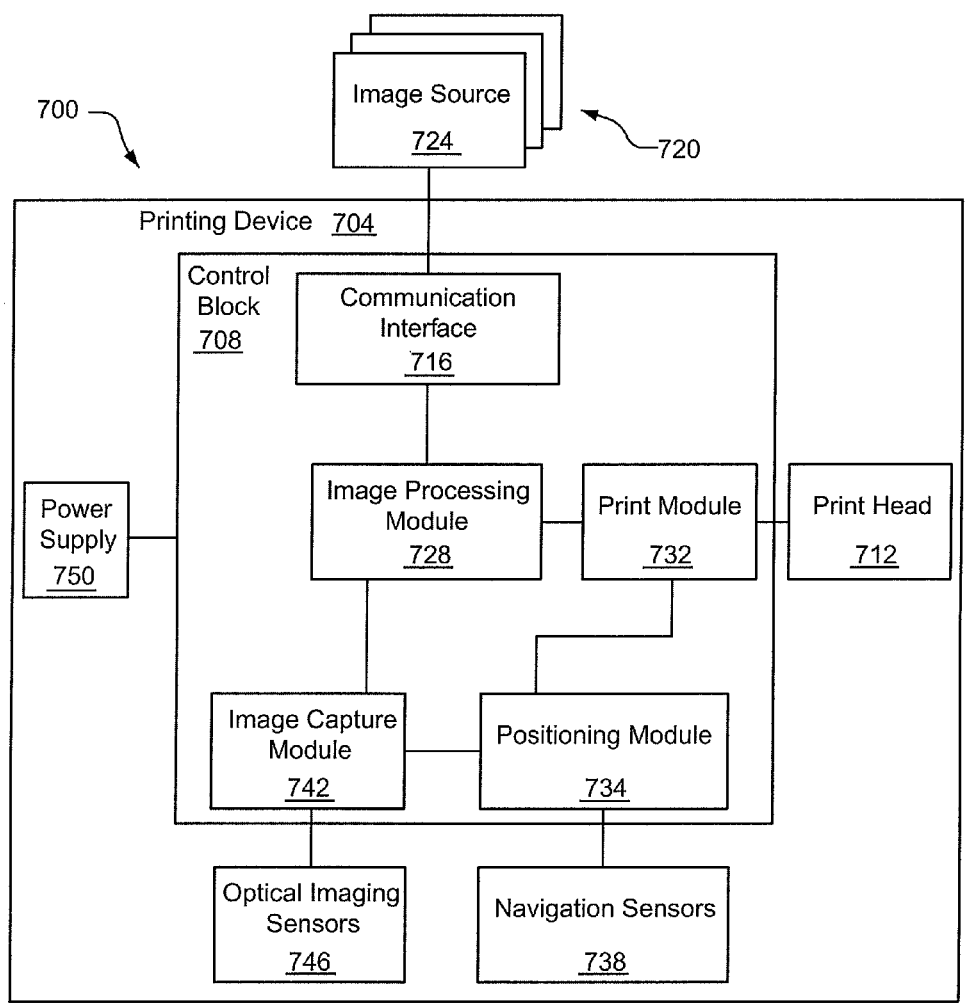
FIG. 7 is a schematic of a system that includes a version of a tattoo printing and scanning device for use in applying a tattoo to a body part in accord with an embodiment of the invention.

FIG. 7 is a schematic of a system 700 that includes a handheld printing and scanning device (hereinafter "printing device 704"), for use in printing a tattoo design on a body part in accord with embodiments of the invention. The printing device 704 includes a control block 708 having components designed to facilitate precise and accurate positioning of a print head 712 throughout an entire printing and/or scanning operation. The use of positioning data provides for reliable image production, through printing, and image acquisition, through scanning, with a mobile and versatile handheld, hand-propelled printing device 704.

The control block 708 has a communication interface 716 configured to communicatively couple the control block 708 to other devices 720, which may include an image source 724. The image source 724 may be any type of device capable of transmitting data related to a tattoo design to be printed. The image source 724 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image source 724 is a removable storage device, e.g., a universal serial bus (USB) storage device, the communication interface may include a port, e.g., USB port, designed to receive the storage device.

The communication interface 716 may include a wireless transceiver to allow the communicative coupling with the image source 724 to take place over a wireless link. The image data may be wirelessly transmitted over the link through the modulation of electromagnetic waves with frequencies in the radio, infrared or microwave spectrums.

A wireless link may contribute to the mobility and versatility of the printing device 704. However, a printing device 704 may additionally/alternatively include a wired link communicatively coupling one or more of the other devices 720 to the communication interface 716.

In some versions of the printing device 704, the communication interface 716 communicates with the other devices 720 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth®, Global System for Mobile Communications (GSM), code-division multiple access (CDMA), Ethernet, etc.

The communication interface 716 transmits the received image data to an on-board image processing module 728. The image processing module 728 processes the received image data in a manner to facilitate an upcoming printing process. Image processing techniques may include dithering, decompression, half-toning, color plane separation, and/or image storage. In various embodiments some or all of these image processing operations may be performed by the image source 724 or another device. The processed image may then be transmitted to a print module 732 where it is cached in anticipation of a print operation.

The print module 732 may also receive positioning information, indicative of a position of the print head 712 relative to a reference point, from a positioning module 734. The positioning module 734 may be communicatively coupled to one or more navigation sensors 738. The navigation sensors 738 may include a light source, e.g., LED, a laser, etc., and an optoelectronic sensor designed to take a series of pictures of a body part surface adjacent to the printing device 704 as the printing device 704 is moved over the body part. The positioning module 734 processes the pictures provided by the navigation sensors 738 to detect structural variations of the body part surface. The movement of the structural variations in successive pictures indicates motion of the printing device 704 relative to the body part. The precise positioning of the navigation sensors 738 can be determined by tracking the movement of the structural variations. The navigation sensors 738 may be maintained in a structurally rigid relationship with the print head 712, thereby allowing for the calculation of the precise location of the print head 712.

The navigation sensors 738 have operating characteristics for tracking movement of the printing device 704 within a desired degree of precision. In one example, the navigation sensors 738 process approximately 1500 frames per second, with each frame including a rectangular array of 18×18 pixels. Each pixel detects a six-bit grayscale value, e.g., capable of sensing 64 different levels of gray.

The print module 732 receives the positioning information and coordinates the location of the print head 712 to a portion of the processed image and a corresponding location on the body part. The print module 732 controls the print head 712 to deposit a printing substance (preferably water-soluble ink) on the body part to render the corresponding portion of the processed image.

The print head 712 may be an inkjet print head having a plurality of nozzles designed to emit liquid ink droplets. The ink, which may be contained in reservoirs/cartridges, may be black and/or any of a number of various colors. A common, full-color inkjet print head may have nozzles for cyan, magenta, yellow, and black ink.

The control block 708 may also include an image capture module 742. The image capture module 742 is communicatively coupled to one or more optical imaging sensors 746. The optical imaging sensors 746 may include a number of individual sensor elements. The optical imaging sensors 746 may be designed to capture a plurality of surface images, which may be individually referred to as component surface images. The image capture module 742 generates a composite image by stitching together the component surface images. The image capture module 742 receives positioning information from the positioning module 734 to facilitate the arrangement of the component surface images into the composite image.

In an embodiment in which the printing device 704 is capable of scanning full color images, the optical imaging sensors 746 have sensor elements capable of scanning different colors.

A composite image acquired by the printing device 704 may be transmitted to one or more of the other devices 720 by, e.g., e-mail, fax, file transfer protocols, etc. The composite image may be additionally/alternatively stored locally by the printing device 704 for subsequent review, transmittal, printing, etc.

In addition (or as an alternative) to composite image acquisition, the image capture module 742 may be utilized for calibrating the positioning module 734. In various embodiments, the component surface images (whether individually, some group, or collectively as the composite image) may be compared to the processed print image rendered by the image processing module 728 to detect accumulated positioning errors and/or to reorient the positioning module 734 in the event the positioning module 734 loses track of its reference point. This may occur, for example, if the printing device 704 is lifted off the body part during a print operation.

The printing device 704 may include a power supply 750 coupled to the control block 708. The power supply 750 may be a mobile power supply, e.g., a battery, a rechargeable battery, a solar power source, etc. In other embodiments the power supply 750 may additionally/alternatively regulate power provided by another component (e.g., one of the other devices 720, a power cord coupled to an alternating current (AC) outlet, etc.).

FIG. 8 is a bottom plan view of the printing device 704 of FIG. 7. The printing device 704 includes two navigation sensors 738, a plurality of optical imaging sensors 746, and a recessed print head 712.

As discussed above, the navigation sensors 738 communicate image data to the positioning module 734, which determines positioning information related to the optical imaging sensors 746 and/or the print head 712. As stated above, the proximal relationship of the optical imaging sensors 746 and/or print head 712 to the navigation sensors 738 may be fixed to facilitate the positioning of the optical imaging sensors 746 and/or print head 712 through information obtained by the navigation sensors 738.

The print head 712 may be an inkjet print head having a number of nozzle rows for different colored inks. In particular, and as shown in FIG. 8, the print head 712 may have a nozzle row 802c for cyan-colored ink, a nozzle row 802m for magenta-colored ink, a nozzle row 802y for yellow-colored ink, and nozzle row 802k for black-colored ink. The nozzle rows of the print head 712 may be arranged around the optical imaging sensors 746. This may allow for the optical imaging sensors 746 to capture information about the ink deposited on the body part, which represents the processed image in various formative stages, for the predominant side-to-side motion of the printing device 704.

In various embodiments the placement of the nozzles of the print head 712 and the sensor elements of the optical imaging sensors 746 may be further configured to account for the unpredictable nature of movement of the hand-propelled printing device 704. For example, while the nozzles and sensor elements are arranged in linear arrays in the printing device 704 other embodiments may arrange the nozzles and/or sensor elements in other patterns. In some embodiments the nozzles may be arranged completely around the sensor elements so that whichever way the printing device 704 is moved the optical imaging sensors 746 will capture component images reflecting deposited ink. In some embodiments, the nozzles may be arranged in rings around the sensor elements (e.g., concentric circles, nested rectangular patterns, etc.).

While the nozzle rows 802c, 802m, 802y, and 802k shown in FIG. 8 are arranged in rows according to their color, other embodiments may intermix the different colored nozzles in a manner that may increase the chances that an adequate amount of appropriate colored ink is deposited on the body part through the natural course of movement of the printing device 700 on the body part.

In the embodiment depicted by FIG. 8, the linear dimension of the optical imaging sensors 746 may be similar to the linear dimension of the nozzle rows of the print head 712. The linear dimensions may refer to the dimensions along the major axis of the particular component, e.g., the vertical axis of the optical imaging sensors 746 as shown in FIG. 8. Having similar linear dimensions may provide that roughly the same amount of passes over a body part are required for a complete scan and print operation. Furthermore, having similar dimensions may also facilitate the positioning calibration as a component surface image captured by the optical imaging sensors 746 may correspond to deposits from an entire nozzle row of the print head 712.

FIG. 9 is a top plan view of the printing device 704 of FIG. 7. The printing device 704 may have a variety of user input/outputs to provide the functionality enabled through use of the printing device 704. Some examples of input/outputs that may be used to provide some of the basic functions of the printing device 704 include, but are not limited to, a print control input 904 to initiate/resume a print operation, a scan control input 308 to initiate/resume a scan operation, and a display 912.

The display 912, which may be a passive display, an interactive display, etc., may provide the user with a variety of information. The information may relate to the current operating status of the printing device 704 (e.g., printing, ready to print, scanning, ready to scan, receiving print image, transmitting print image, transmitting scan image, etc.), power of the battery, errors (e.g., scanning/positioning/printing error, etc.), instructions (e.g., "position device over a printed portion of the image for reorientation," etc.). If the display 912 is an interactive display it may provide a control interface in addition to, or as an alternative from, the control inputs 904 and 908.

Figure 10:
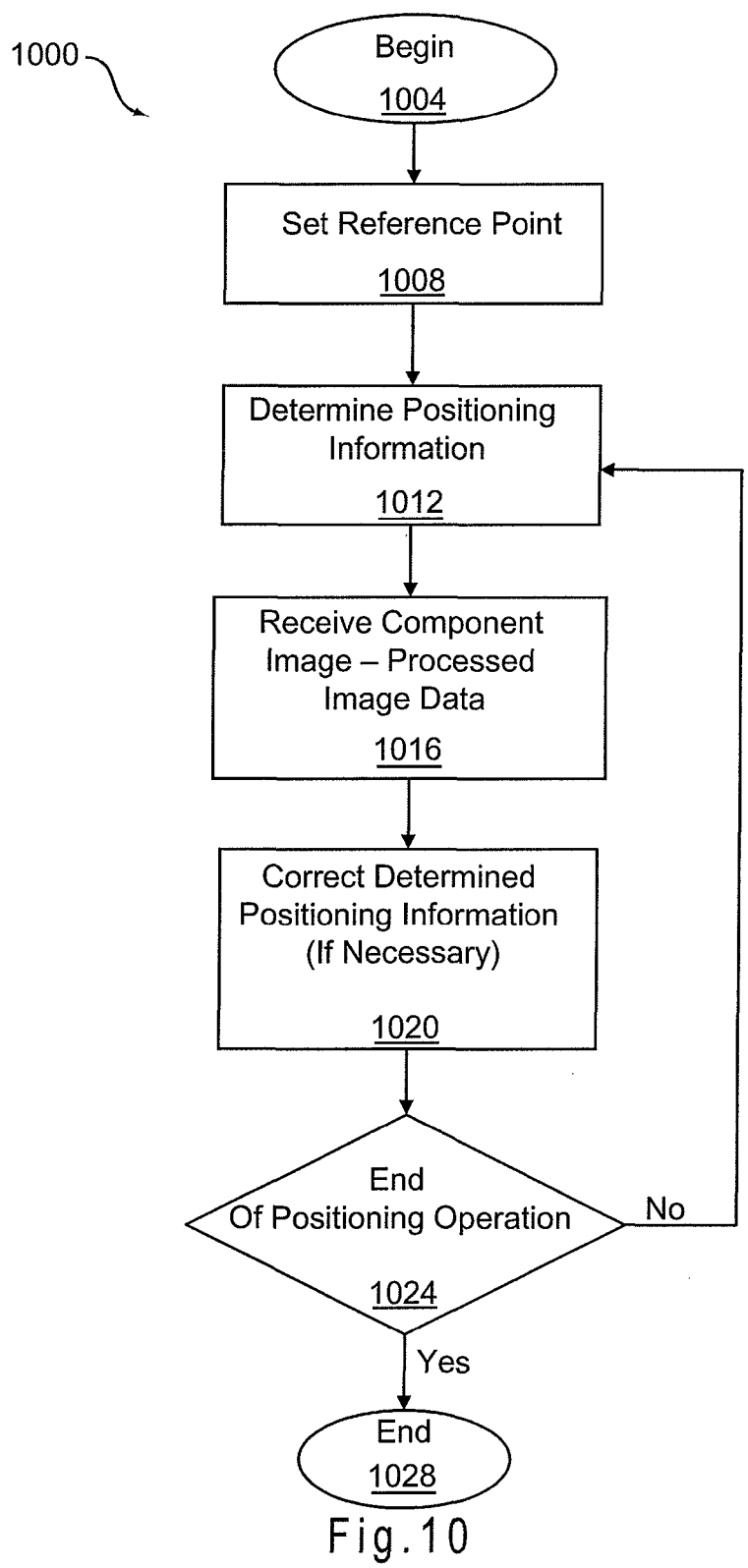
FIG. 10 shows acts of a positioning operation of a tattoo printing and scanning device in accord with various embodiments of the present invention.

FIG. 10 shows acts 1000 of a positioning operation of the printing device 700 in accordance with various embodiments of the present invention. A positioning operation may begin with an initiation of a scanning or a printing operation, e.g., by activation of the print control input 904 or the scan control input 908 (Act 1004). The positioning module 734 within the printing device 700 may set a reference point (Act 1008). The reference point may be set when the printing device 700 is placed on a body part at the beginning of a print job. This may be ensured by the user being instructed to activate the control input once the printing device 704 is in place and/or by the proper placement of the printing device 704 being treated as a condition precedent to instituting the positioning operation. In some embodiments the proper placement of the printing device 704 may be automatically determined through the navigation sensors 738, the optical imaging sensors 746, and/or some other sensors (e.g., a proximity sensor).

Once the reference point is set, the positioning module 734 determines positioning information, e.g., translational and/or rotational changes from the reference point, using the navigation sensors 738 (Act 1012). The translational changes may be determined by tracking incremental changes of the positions of the navigation sensors along a two-dimensional coordinate system, e.g., $\Delta x$ and $\Delta y$. Rotational changes may be determined by tracking incremental changes in the angle of the printing device with respect to either the x-axis or the y-axis. These transitional and/or rotational changes may be determined by the positioning module 734 comparing consecutive navigational images taken by the navigation sensors 738 to detect these movements.

The positioning module 734 may also receive component surface images from the optical imaging sensors 746 and processed image data from the image processing module (Act 1016). If the positioning information is accurate, a particular component surface image from a given location should match a corresponding portion of the processed image. If the given location is one in which the print head 712 has deposited something less than the target print volume for the location, the corresponding portion of the processed image may be adjusted to account for the actual deposited volume for comparison to the component surface image. In the event that the print head 712 has yet to deposit any material in the given location, the positioning information may not be verified through this method. However, the verification of the positioning information may be done frequently enough given the constant movement of the printing device 704 and the physical arrangement of the nozzle rows of the print head 712 in relation to the optical imaging sensors 746.

If the particular component surface image from the given location does not match the corresponding portion of the processed image, the positioning module 734 may correct the determined positioning information (Act 1020). Given adequate information, e.g., sufficient material deposited in the location captured by the component surface image, the positioning module 734 may set the positioning information to the offset of the portion of the processed image that matches the component surface image. In most cases this may be an identified pattern in close proximity to the location identified by the incorrect positioning information. In the event that the pattern captured by the component surface image does not identify a pattern unique to the region surrounding the incorrect positioning information, multiple component surface images may be combined in an attempt to identify a unique pattern. Alternatively, correction may be postponed until a component surface image is captured that does identify a pattern unique to the surrounding region.

In some embodiments, correction of the determined positioning information may be done periodically in order to avoid overburdening the computational resources of the positioning module 734.

Following correction, the positioning module 734 determines whether the positioning operation is complete (Act 1024). If it is determined that the positioning operation is not yet complete, the operation loops back (to Act 1012). If it is determined that it is the end of the positioning operation, the operation ends (Act 1028). The end of the positioning operation may be tied to the end of the printing/scanning operation, which will be discussed with reference to FIGS. 11 and 12, respectively.

Figure 11:
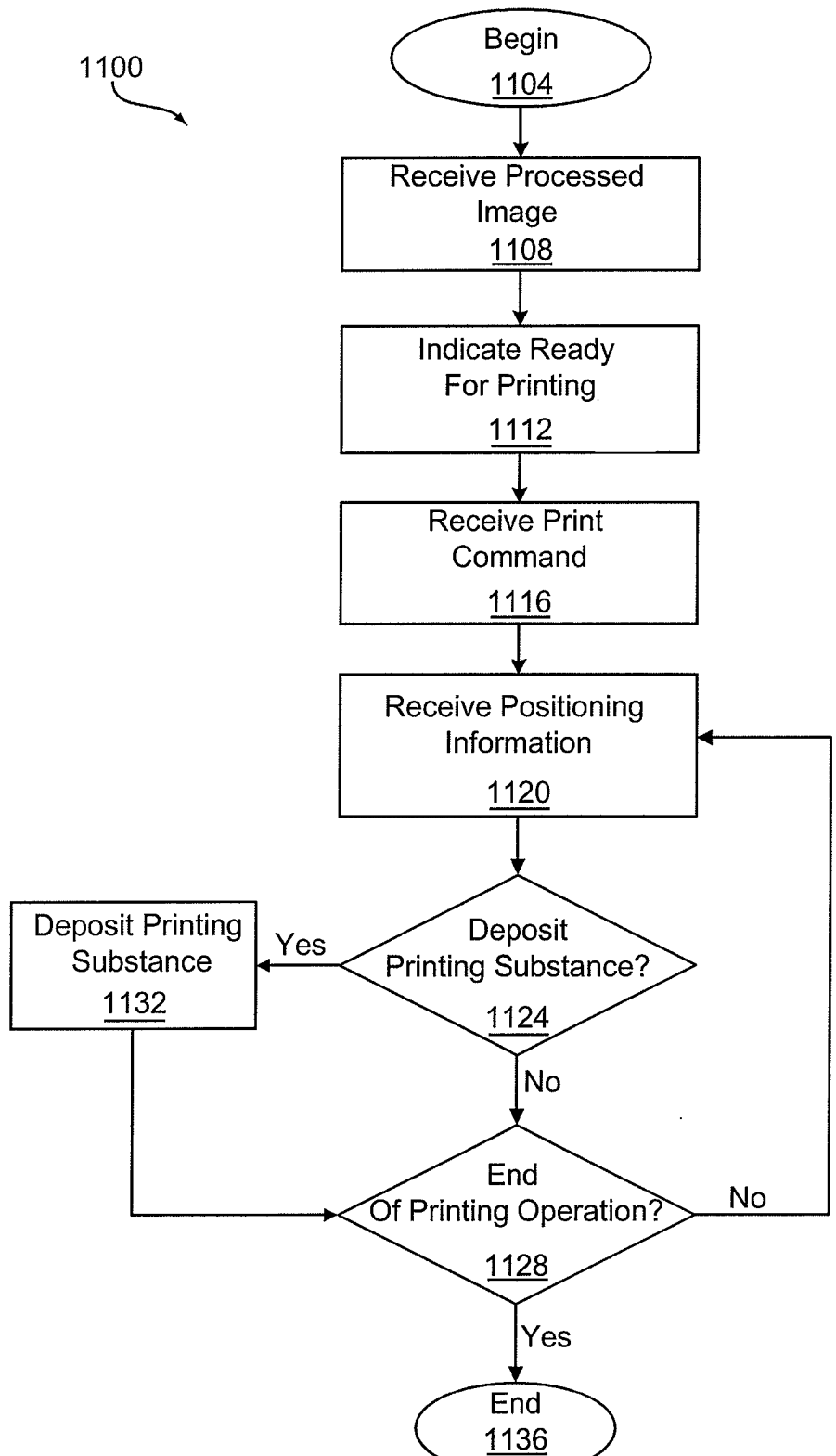
FIG. 11 shows acts of a printing operation implemented by the tattoo printing and scanning device of FIG. 7.

FIG. 11 shows acts 1100 of a printing operation of the printing device 704 in accord with various embodiments of the present invention. The printing operation begins (Act 1104) and the print module 732 receives a processed image from the image processing module 728 (Act 1108). Upon receipt of the processed image, the display 912 indicates that the printing device 700 is ready for printing (Act 1112).

The print module 732 receives a print command generated from a user activating the print control input 904 (Act 1116). The print module 732 receives positioning information from the positioning module 734 (Act 1120). The print module 732 determines whether to deposit printing substance at the given position (Act 1124). The determination as to whether to deposit printing substance may be a function of the total drop volume for a given location and the amount of volume that has been previously deposited.

If it is determined that no additional printing substance is to be deposited, the operation may advance to determine whether the end of the print operation has been reached (Act 1128). If it is determined that additional printing substance is to be deposited, the print module 732 causes an appropriate amount of printing substance to be deposited by generating and transmitting control signals to the print head 712 that cause the nozzles to drop the printing substance (Act 1132).

The determination of whether the end of the printing operation has been reached may be a function of the printed volume versus the total print volume. In some embodiments the end of the printing operation may be reached even if the printed volume is less than the total print volume. For example, an embodiment may consider the end of the printing operation to occur when the printed volume is ninety-five percent of the total print volume. However, it may be that the distribution of the remaining volume is also considered in the end of print analysis. For example, if the five percent remaining volume is distributed over a relatively small area, the printing operation may not be considered to be completed.

In some embodiments, an end of print job may be established by a user manually cancelling the operation.

If it is determined that the printing operation has been completed, the printing operation ends (Act 1136).

If it is determined that the printing operation has not been completed, the printing operation loops back (to Act 1120).

Figure 12:
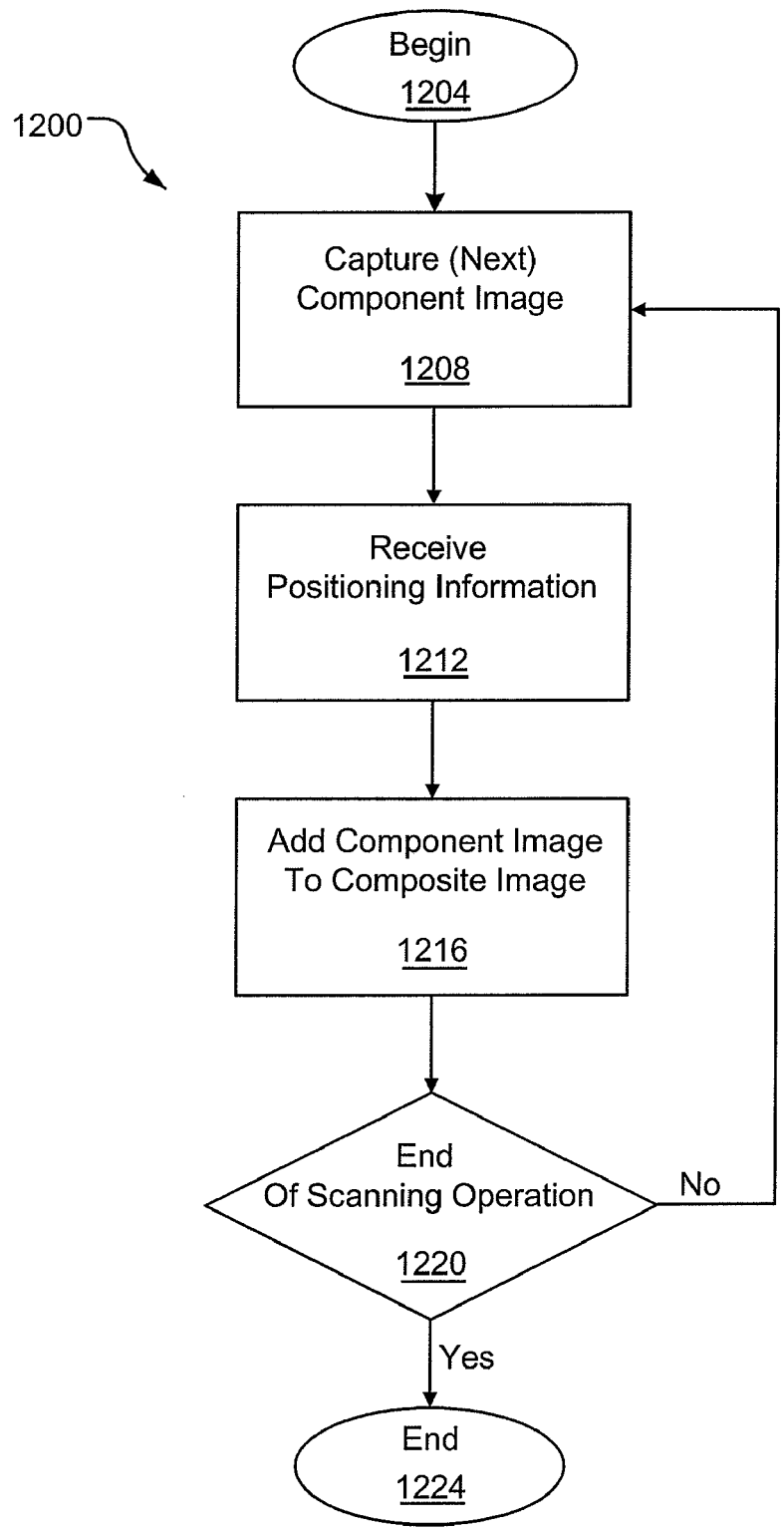
FIG. 12 shows acts of a scanning operation implemented by the tattoo printing and scanning device of FIG. 7.

FIG. 12 shows acts 1200 of a scanning operation of the printing device 704 for use in acquiring a tattoo design in accord with an embodiment of the invention. The scanning operation begins with the receipt of a scan command generated from a user activating the scan control input 908 (Act 1204).

The image capture module 742 controls the optical imaging sensors 746 to capture one or more component images (Act 1208). In some embodiments, the scan operation will only commence when the printing device 704 is placed on a print medium. This may be ensured by manners similar to those discussed above with respect to the printing operation, e.g., by instructing the user to initiate scanning operation only when the printing device 704 is in place and/or automatically determining that the printing device 704 is in place.

The image capture module may receive positioning information from the positioning module (Act 1212) and add the component images to the composite image (Act 1216). The image capture module determines whether the scanning operation is complete (Act 1220).

The end of the scanning operation may be determined through a user manually cancelling the operation and/or through an automatic determination. In some embodiments, an automatic determination of the end of print job may occur when all interior locations of a predefined image border have been scanned. The predefined image border may be determined by a user providing the dimensions of the image to be scanned or by tracing the border with the printing device 704 early in the scanning sequence.

If it is determined that the scanning operation has been completed, the scanning operation ends (Act 1224).

If it is determined that the scanning operation has not been completed, the printing operation loops back (to Act 1208).

Figure 13:
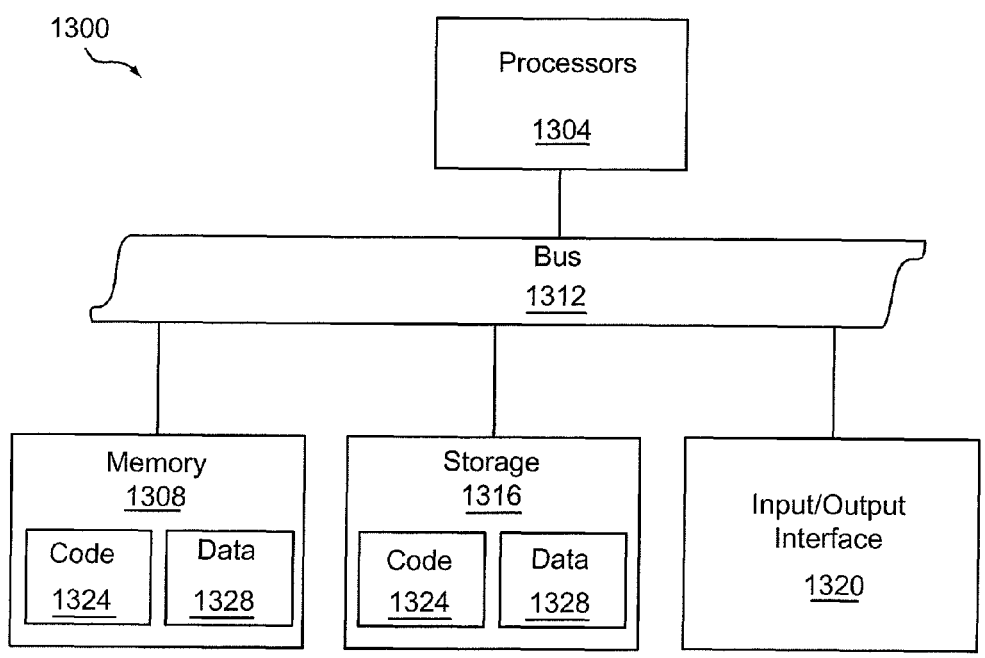
FIG. 13 illustrates a version of a computing device that implements the control block of the tattoo printing and scanning device of FIG. 7.

FIG. 13 illustrates a version of a computing device 1300 implementing a control block, e.g., control block 708. Computing device 1300 includes one or more processors 1304, memory 1308, and bus 1312, coupled to each other as shown. Additionally, computing device 1300 includes storage 1316, and one or more input/output interfaces 1320 coupled to each other, and the earlier described elements as shown. The components of the computing device 1300 may be designed to provide the printing, scanning, and/or positioning functions of a control block of a printing device as described herein.

Memory 1308 and storage 1316 may include, in particular, temporal and persistent copies of code 1324 and data 1328, respectively. The code 1324 may include instructions that when accessed by the processors 1304 result in the computing device 1300 performing operations as described in conjunction with various modules of the control block in accordance with embodiments of this invention. The processing data 1328 may include data to be acted upon by the instructions of the code 1324. In particular, the accessing of the code 1324 and data 1328 by the processors 1304 may facilitate printing, scanning, and/or positioning operations as described herein.

The processors 1304 may include one or more single-core processors, multiple-core processors, controllers, application-specific integrated circuits (ASICs), etc.

The memory 1308 may include random access memory (RAM), dynamic RAM (DRAM), static RAM (SRAM), synchronous DRAM (SDRAM), dual-data rate RAM (DDRRAM), etc.

The storage 1316 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 1316 may be a storage resource physically part of the computing device 1300 or it may be accessible by, but not necessarily a part of, the computing device 1300. For example, the storage 1316 may be accessed by the computing device 1300 over a network.

The I/O interfaces 1320 may include interfaces designed to communicate with peripheral hardware, e.g., print head 712, navigation sensors 738, optical imaging sensors 746, etc., and/or remote devices, e.g., other devices 720.

In various embodiments, computing device 1300 may have more or less elements and/or different architectures.

All of the discussion above, regardless of the particular implementation being described, is exemplary in nature, rather than limiting. Although specific components of the devices disclosed herein are described, methods, systems, and articles of manufacture consistent with the devices (e.g., tattoo printer 102 and printing device 704) may include additional or different components. For example, components of the devices 102 and 704, host 116, and image source 720 may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the devices 102 and 704, host 116, and image source 720 may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A tattoo printer, comprising:
   a sensor element configured to capture images of a surface indicative of movement of the tattoo printer;
   a position module to determine position data of the tattoo printer in response to the movement of the tattoo printer on the surface, wherein the position data includes a location and an orientation of the tattoo printer relative to an origin and an initial orientation;
   a print mechanism including a plurality of nozzles arranged in at least one ring in a plane facing the surface, wherein the sensor element is positioned inside the at least one ring; and
   a processor to receive image data corresponding to a tattoo design and to communicate print data to a print mechanism, wherein the print data is based on the image data and the position data.

2. The tattoo printer of claim 1 wherein the tattoo design is selected from a group consisting of: an image, a graphic, a word, and a phrase.

3. The tattoo printer of claim 1 wherein the print mechanism is a multi-color print mechanism.

4. The tattoo printer of claim 1 further comprising a wireless interface to communicate with a host for receiving the image data.

5. The tattoo printer of claim 1 wherein the at least one ring comprises a plurality of rings.

6. The tattoo printer of claim 1 further comprising a housing having a length of approximately five inches, a width of approximately two inches, and a height of approximately one inch.

7. The tattoo printer of claim 1 wherein the processor determines a reference point of the surface.

8. The tattoo printer of claim 1 wherein the position module comprises:
   a movement module to generate movement data in response to movement of the tattoo printer, the movement data indicative of the location and the orientation of the tattoo printer relative to the origin and the initial orientation; and
   first and second motion sensors to communicate motion signals to the movement module in response to the movement of the tattoo printer.

9. The tattoo printer of claim 1 wherein the tattoo design is selected by a user from a stored tattoo library.

10. A tattoo printer, comprising:
    means for capturing images of a surface indicative of movement of the tattoo printer;
    means for determining position data of the tattoo printer in response to the movement of the tattoo printer on the surface; and
    means for receiving image data corresponding to a tattoo design; and
    means for communicating print data to a print mechanism, wherein the print data is based on the image data and the position data, wherein the print mechanism includes a plurality of nozzles arranged in at least one ring facing the surface and surrounding the means for capturing images.

11. The tattoo printer of claim 10 further comprising:
    means for communicating with a host for receiving the image data; and
    means for determining a reference point of the surface.

12. The tattoo printer of claim 10 further comprising means for generating movement data in response to movement of the tattoo printer.

13. A method comprising:
    capturing, using an optical imaging sensor, images of a surface indicative of movement of a printer;
    determining position data of the printer in response to movement of the printer on the surface, wherein the position data includes a location and an orientation of the printer relative to an origin and an initial orientation;
    receiving image data; and
    communicating print data to a print mechanism, wherein the print data is based on the image data and the position data, and wherein the print mechanism includes a plurality of nozzles arranged in at least one ring with the optical imaging sensor in a center of the at least one ring.

14. The method of claim 13 wherein the print mechanism is configured for printing multi-color designs.

15. The method of claim 13 further comprising communicating with a host for receiving the image data.

16. The method of claim 13 further comprising determining a reference point of the surface.

17. The method of claim 13 further comprising generating movement data in response to movement of the printer, the movement data indicative of the location and the orientation of the printer relative to the origin and the initial orientation.

18. A computer readable storage medium having processor executable instructions to:
- capture images, using a sensor element, of a surface indicative of movement of a tattoo printer;
- determine position data of the tattoo printer in response to movement of the tattoo printer on the surface, wherein the position data includes a location and an orientation of the tattoo printer relative to an origin and an initial orientation;
- receive image data corresponding to a tattoo design; and
- communicate print data to a print mechanism, wherein the print data is based on the image data and the position data, wherein the print mechanism includes a plurality of nozzles arranged in a plane and in at least one ring with the sensor element inside the at least one ring.

19. The computer readable storage medium of claim 18 having processor executable instructions to communicate with a host for receiving the image data.

20. The computer readable storage medium of claim 18 having processor executable instructions to determine a reference point of the surface.

21. The computer readable storage medium of claim 18 having processor executable instructions to generate movement data in response to movement of the tattoo printer, the movement data indicative of the location and the orientation of the tattoo printer relative to the origin and the initial orientation.

* * * * *